United States Patent [19]

Takahashi

[11] Patent Number: 5,337,299

[45] Date of Patent: * Aug. 9, 1994

[54] OPTICAL INFORMATION-REPRODUCING APPARATUS USING SEPARATELY LOCATED PHOTO DETECTOR ASSEMBLIES

[75] Inventor: Shinichi Takahashi, Saitama, Japan

[73] Assignee: Pioneer Electronic Corporation, Tokyo, Japan

[*] Notice: The portion of the term of this patent subsequent to Feb. 9, 2010 has been disclaimed.

[21] Appl. No.: 892,234

[22] Filed: Jun. 2, 1992

[30] Foreign Application Priority Data

Nov. 18, 1991 [JP] Japan ................................. 3-301774

[51] Int. Cl.⁵ ............................................... G11B 7/12
[52] U.S. Cl. ............................... 369/44.37; 369/44.23; 369/44.12; 369/44.14; 369/112
[58] Field of Search ................ 369/44.23, 44.37, 44.41, 369/44.11, 44.12, 112, 110, 44.14

[56] References Cited

U.S. PATENT DOCUMENTS

| | | | |
|---|---|---|---|
| 4,358,200 | 11/1982 | Heemskerk et al. | 356/123 |
| 4,753,513 | 6/1988 | Shikama | 369/44.37 X |
| 4,768,183 | 8/1988 | Ohnishi et al. | 369/112 |
| 4,817,072 | 3/1989 | Toide et al. | 369/44 |
| 4,817,074 | 3/1989 | Yamanaka | 369/46 |
| 5,084,851 | 1/1992 | Noda et al. | 369/44.42 |
| 5,095,476 | 3/1992 | Greve et al. | 369/112 X |
| 5,185,731 | 2/1993 | Takahashi | 369/44.23 |

FOREIGN PATENT DOCUMENTS 62-114131  5/1987  Japan .
63-119024  5/1988  Japan .

*Primary Examiner*—Aristotelis Psitos
*Assistant Examiner*—Mohammad Edun

[57] ABSTRACT

A light beam emitted from a light source is split into three light beams by diffracting the light beam by using a diffraction grating. The three light beams are reflected by the first side of a plane-parallel plate. The reflected light beams are projected onto an optical disk. The three signal light beams are reflected on the optical disk and returned to the plane-parallel plate in the form of three signal light beams. The plane-parallel plate allows part of the signal light beams to transmit therethrough and to reach a first photo detector. Further, the plane-parallel plate reflects the signal light beams on the second side and allows the reflected light beams to pass therethrough before reaching a second photo detector. The first photo detector receives the central light beam. The second photo detector receives the side light beams.

3 Claims, 3 Drawing Sheets

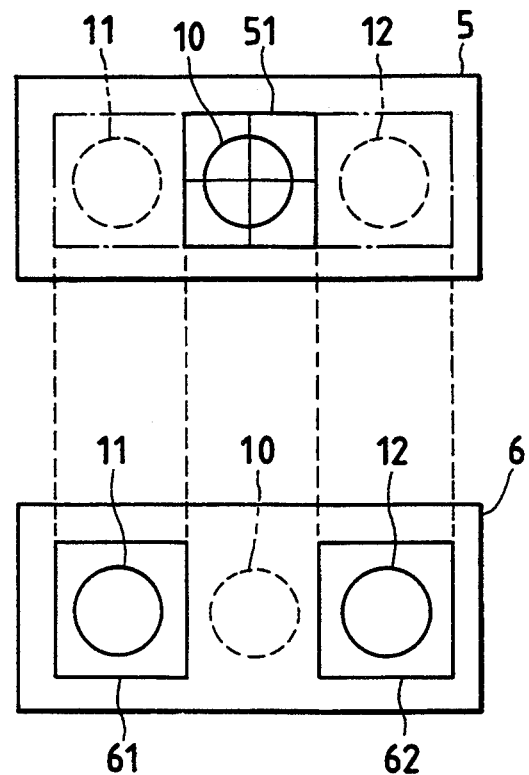
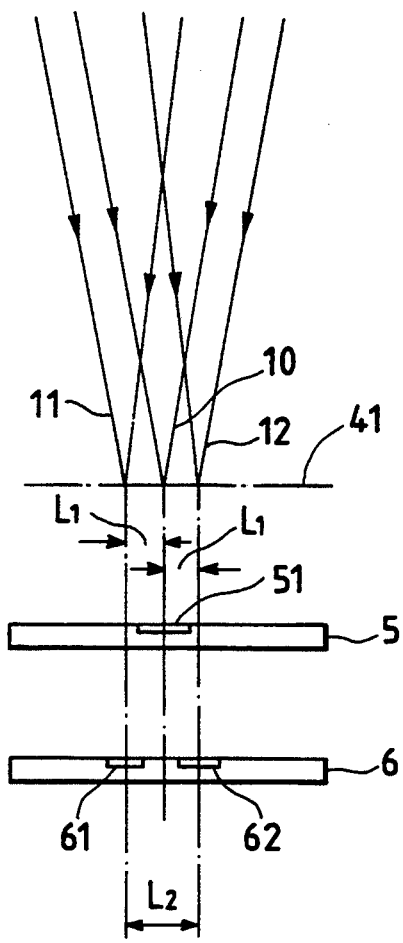

OPTICAL INFORMATION-REPRODUCING APPARATUS USING SEPARATELY LOCATED PHOTO DETECTOR ASSEMBLIES

BACKGROUND OF THE INVENTION

1. Field of the Invention

The present invention relates to an optical information-reproducing apparatus for recording data signals, such as image data signals, on a recording medium, and for reproducing the data signals from the recording medium. More particularly, the invention relates to an optical information-reproducing apparatus of the three-beam type which astigmatizes light beams by using a plane-parallel plate.

2. Background of the Invention

A conventional three-beam type optical information-reproducing apparatus is shown in FIGS. 4 and 5. The optical information-reproducing apparatus is composed of a light source 1, a diffraction grating 2, a plane-parallel plate 3, an objective lens 4, a concave lens 7, and a photo detector 8. The light source 1, which may be a semiconductor laser, emits a light beam for reading data from an optical disk 100. The diffraction grating 2 splits a light beam emitted from the light source 1 into three light beams. The plane-parallel plate 3 reflects the three light beams toward the optical disk 100, and receives signal light beams reflected from the optical disk 100, astigmatizes the received signal light beams, and emits them outwardly towards the concave lens 7. The objective lens 4 receives the three signal light beams reflected by the plane-parallel plate 3, and forms an image on the recording surface 101 of the optical disk 100. The concave lens 7 receives the three signal light beams emitted from the plane-parallel plate 3, expands the spaces (to be described below with respect to FIG. 5) between the three light beams, and forms the image on the surface of the photo detector 8.

The operation of the optical information-reproducing apparatus thus constructed will now be described. The light beam emitted from the light source 1 is diffracted in the three directions of 0th order, +1st order, and −1st order by means of the diffraction grating 2. In other words, the light beam is split into three light beams. The three light beams are all reflected on one of the major surfaces of the plane-parallel plate 3, and are projected onto the recording surface 101 of the optical disk 100 through the objective 4. The three light beams falling on the recording surface 101 of the optical disk are then modulated in intensity according to the different reflectivities of the recording surface. The light beams reflected from the recording surface are thus intensity modulated in accordance with the recorded information. That is, the light beams are transformed into signal light. The signal light beams enter the plane-parallel plate 3 through the objective 4. In the plane-parallel plate, the signal light beams are astigmatized and then emanate from the plane-parallel plate. The signal light beams are incident on the concave lens 7 at such an angle that the beams are focused in the front focal plane 41 of the objective 4 (see FIG. 5). The signal light beams, after passing through the concave lens 7, are focused on the light sensing surface of the photo detector 8.

If the concave lens 7 is not used, the three signal light beams are spaced by narrow distances L1 and are projected on the front focal plane 41 spaced a vertical distance L3 from the photo detector 8. With use of the concave lens 7, the diffusion characteristic of the concave lens 7, which depends on the magnification of the concave lens 7, acts on the signal light beams so that they are spaced by expanded distances L2 (L2>L1) and are projected onto the light sensing surface of the photo detector 8. Usually, two-division photo diodes (2D-PD) 82 and 83 and a four-division photo diode (4D-PD) 81 are formed in the light sensing surface of the photo detector. Accordingly, the three signal light beams are imaged exactly in these photo diodes. Such an arrangement is described in Japanese Patent Laid-Open Publication No. Sho. 57-205833.

A conventional optical information-reproducing apparatus not using the concave lens 7 is disclosed in Japanese Patent Laid-Open Publication No. Sho. 63-4435. In this apparatus, the light sensing surface of the photo detector 8 is coincident with the front focal plane 41 of the objective 4. The 4D-PD 81 and the 2D-PDs 82 and 83 are microfabricated in the light sensing surface of the photo detector 8 so that the three signal light beams, spaced by narrow distances, will exactly fall on these photo diodes.

The first conventional device described above requires the provision of the concave lens in order to expand the beam-to-beam distance of the three signal light beams. Further, the optical path is necessarily extended by a length L3 which depends on the length of the concave lens (FIG. 5). These facts make it difficult to obtain an overall size reduction of the apparatus.

In the second conventional device described above, a plurality of photo diodes must be microfabricated in the surface of the photo detector in a high precision manner. This requires a high order of complexity in the microfabricating technique as compared to the first conventional device. Further, with this device the beam-to-beam distance is greatly limited, thus restricting the manufacturing freedom.

SUMMARY OF THE INVENTION

The present invention has been made in view of the above circumstances and has as an object the provision of an optical information-reproducing apparatus which can reduce the size of the overall apparatus, and provide easy manufacture of the signal light receiving portion (i.e., the photo diode assembly).

To achieve the above object, there is provided an optical information-reproducing apparatus comprising: a light source for emitting light beams for reading data from the recording surface of a recording medium; a diffraction grating for diffracting a light beam emitted from the light source, thereby to split the light beam into three light beams arranged in the diffraction directions; a plane-parallel plate made of a medium having two major sides, a first side and a second side, parallel to each other, the plane-parallel plate reflecting the three light beams on the outer surface of the first side toward the recording surface of the recording medium, the plane-parallel plate then receiving the signal light beams reflected from the recording surface of the recording medium, allowing part of the received signal light beams to be transmitted therethrough, and emitting the same from the outer surface of the second side of the plane-parallel plate, and the plane-parallel plate reflecting part of the signal light beams on the inner surface of the second side of the plane-parallel plate, allowing the reflected signal light beams to pass therethrough, and causing the same to be emitted from the outer surface of the first side of the plane-parallel plate; an objective lens for imaging the three signal light beams, which are reflected on the outer surface of the first side of the plane-parallel plate, in the recording surface of the recording medium; first photo detecting means for receiving the center light beam or the side light beams of the three signal light beams emanating from the outer surface of the second side of the plane-parallel plate, thereby to detect the signal light; and second photo detecting means for receiving the side light beams or the central light beam of the three signal light beams emanating from the outer surface of the second side of the plane-parallel plate, thereby to detect the signal light.

With such a construction of the optical information-reproducing apparatus of the present invention, a light beam emitted from the light source is split into three light beams by diffracting the light beams by means of the diffraction grating. The three light beams are reflected by the first side of the plane-parallel plate. The reflected light beams are projected onto the recording medium through the objective. The three signal light beams are reflected on the recording medium and returned to the plane-parallel plate in the form of three signal light beams (modulated by information recorded on the disc). The plane-parallel plate receives signal light beams from the recording medium, allows part of the signal light beams to be transmitted therethrough, emitting the same from the second side thereof. Further, the plane-parallel plate reflects the signal light beams on the second side, allows the reflected light beams to pass through the plane-parallel plate, and emits the thus-reflected signal light beams from the first side of the plane-parallel plate.

For signal detection, a first photo detecting means receives the central light beam (or the side light beams) of the three total signal light beams emanating from the plane-parallel plate. The second photo detecting means receives the side light beams (or the central light beam). That is, if the first photo detecting means receives the central light beam, the second photo detecting means receives the two side light beams. With use of the first and second photo detecting means thus receiving the signal light beams, the distance between the photo detecting elements of the photo detecting means can be expanded. Accordingly, there is no need for a complex and precise microfabricating technique for fabricating the photo detecting means. Further, since there is no need to use a concave lens 7, the optical path of the signal light beams can be reduced in length, leading to a size reduction of the overall apparatus.

BRIEF DESCRIPTION OF THE DRAWINGS

FIG. 2(a) and 2(b) show enlarged views of a photo detector portion of the apparatus of FIG. 1;

FIG. 3(a) and 3(c) are explanatory diagrams for explaining a state of receiving signal light beams in the apparatus of FIG. 1;

DETAILED DESCRIPTION OF THE PREFERRED EMBODIMENT

Figure 1:
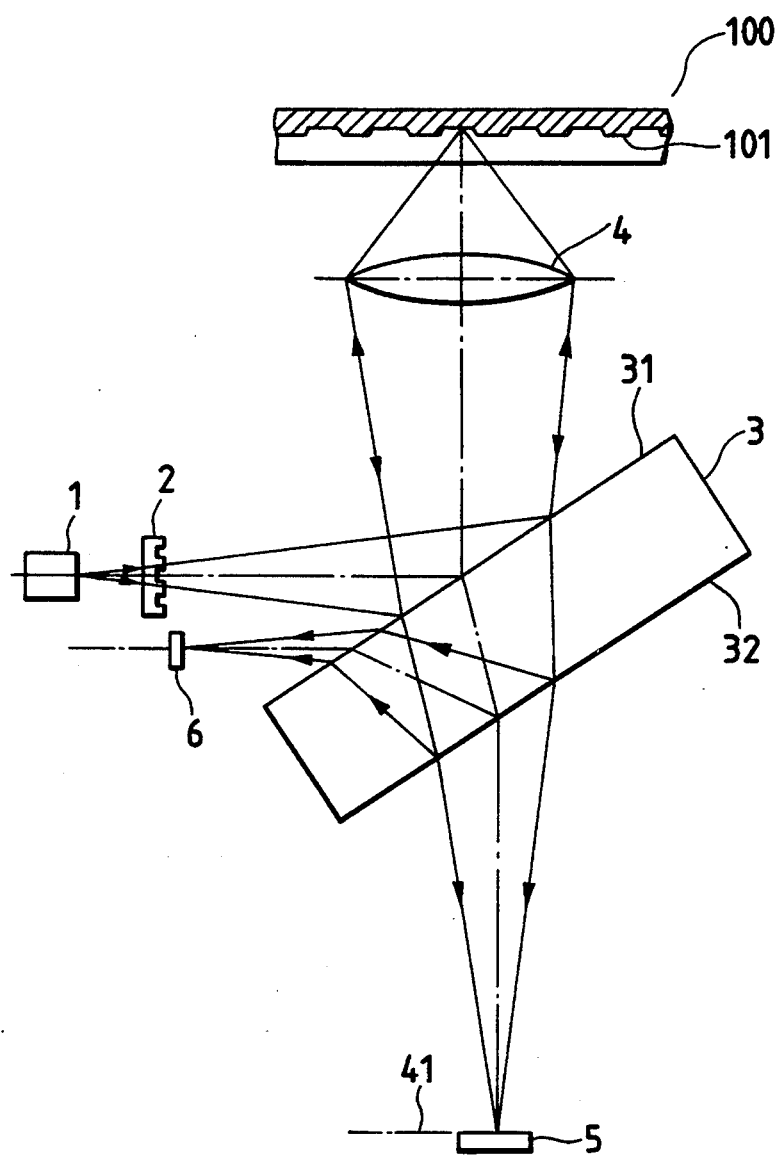
FIG. 1 is a diagrammatic view showing the overall construction of an optical information-reproducing apparatus according to a preferred embodiment of the present invention.
Figure 4:
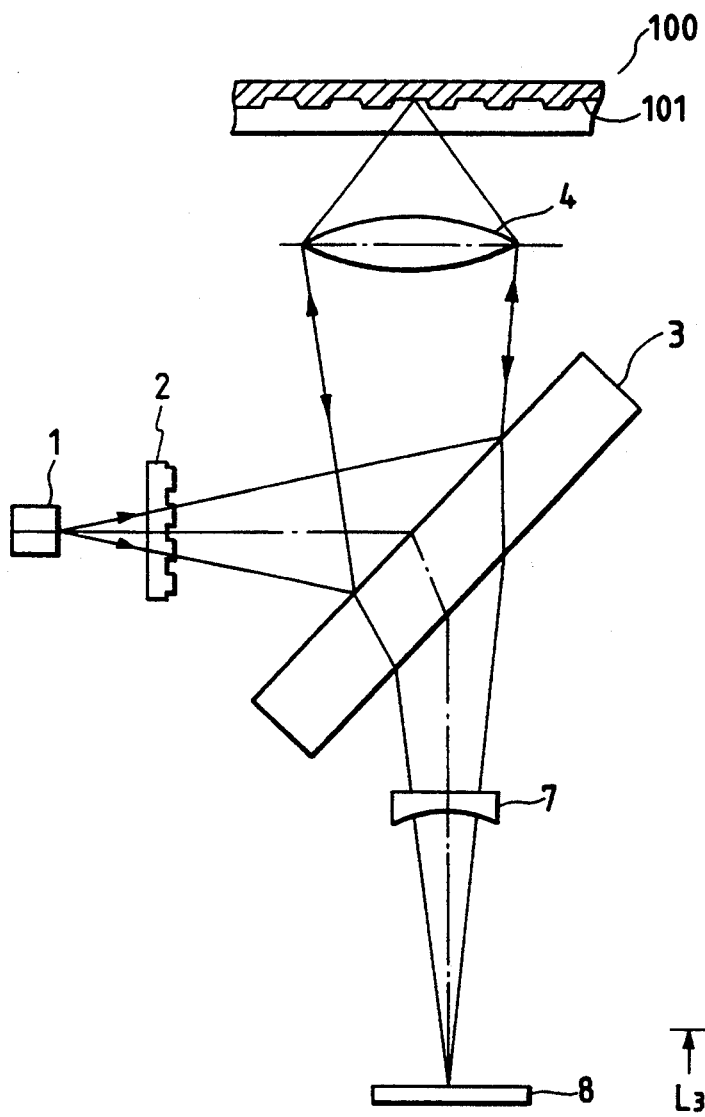
FIG. 4 is a diagrammatic view showing the overall construction of a conventional optical information-reproducing apparatus.
Figure 5:
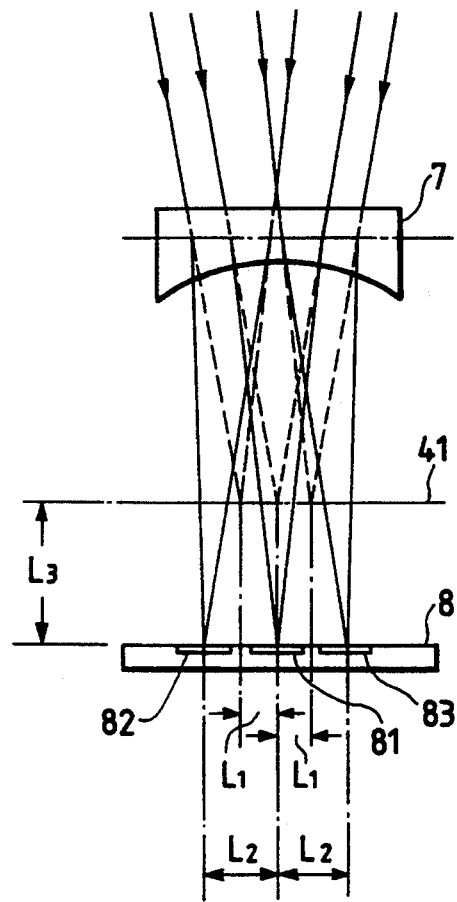
FIG. 5 shows an enlarged view of a photo detector portion of the conventional apparatus of FIG. 4.

The preferred embodiment of an optical information-reproducing apparatus according to the present invention will be described in detail with reference to FIGS. 1 through 3. In each figure, the optical information-reproducing apparatus, like the prior apparatus shown in FIG. 4, comprises a light source 1, a diffraction grating 2, a plane-parallel plate 3, and an objective lens 4, and further comprises first and second photo detectors 5 and 6 respectively receiving signal light beams emanating from the plane-parallel plate 3. The spectral state (optical path) of the light beams received by the first photo detector 5 is different from that of the light beams received by the photo detector 6.

The plane-parallel plate 3 is made of a transparent medium having first and second major surfaces 31 and 32 arranged parallel to each other. The diffraction grating 2 splits the beams of received light into three light beams of the 0th order and the ±1st order. These three light beams are reflected on the first surface 31 toward the optical disk 100. The signal light beams are further reflected on the recording surface 101 of the optical disk 100. There, the beams are modulated by data recorded in the recording surface 101, whereupon the beams become modulated signal beams. The signal light beams returned from the recording surface impinge on the first surface 31 of the plane-parallel plate, and are transmitted therethrough and emanate from the second surface 32 of the plane-parallel plate. Parts of the signal light beams, however, are reflected on the second surface 32, and transmitted back through the plane-parallel plate and emitted from the first surface 31 as shown in FIG. 1.

The first photo detector 5 contains a four-division photo diode (4D-PD) 51 (see FIG. 2(a)) formed on the surface thereof facing the second surface 32 of the plane-parallel plate 3. The photo-diode formed surface of the detector is located in the front focal plane 41 of the objective 4. Thus, there is no need to use a concave lens 7 as was used in the prior art of FIG. 4.

The photo detector 5 detects a signal light beam 10 (see FIGS. 2 and 3) as the main beam (the 0th order), which is the center light beam of the three light beams emanating from the second surface 32 of the plane-parallel plate 3. The output signal of the first photo detector 5 will be used as an RF signal and a focus servo control signal.

The second photo detector 6 contains two two-division photo diodes (2D-PD) 61 and 62 formed on the surface thereof facing the first surface 31 of the plane-parallel plate 3. The photo-diodes 61 and 62 are located in the front focal plane 41 of the objective 4. The second photo detector 6 detects signal light beams 11 and 12 as the sub-beams (±1st order), which are the two side light beams of the three light beams emanating from the second surface 32 of the plane-parallel plate 3. The output signal of the first photo detector 5 will be used as a tracking servo control signal.

The operation of the optical information-reproducing apparatus thus constructed will now be described.

A light beam emitted from the light source 1 is diffracted in three directions of 0th order and ±1st order, so that it is split into three light beams arrayed side by side in the diffraction direction. These light beams are reflected on the first surface 31 of the plane-parallel plate 3 toward the optical disk 100. The reflected light beams are imaged on the recording surface 101 of the optical disk 100 through the objective 4. The light beams are intensity modulated with different reflectivities depending on the data recorded on the recording surface 101. Accordingly, the light beams reflected from the recording surface are intensity modulated light beams, designated by reference numerals 10, 11, and 12.

Part of the three light beams 10, 11, and 12 are transmitted through the plane-parallel plate 3 and hit the 4D-PD 51 of the first photo detector 5. The remaining parts of the light beams are reflected on the second surface 32 of the plane-parallel plate 3, and are transmitted through the plane-parallel plate, emanating therefrom, and finally strike the two 2D-PDs 61 and 62 of the second photo detector 6.

The three signal light beams 10, 11, and 12 are projected onto the 4D-PD 51 and the two 2D-PDs 61 and 62 as shown in FIG. 3 (a). Of those signal light beams 10, 11, and 12, the main beam or the central signal light beam 10, as shown in FIG. 3(b), is received by the 4D-PD 51. A well known means then forms an RF signal and a focus servo control signal from the output signal of the 4D-PD. The two sub-beams 11 and 12, as shown in FIG. 3(c), are received by the two 2D-PDs 61 and 62 spaced by a large distance L2 (L1>L1). A well known means forms a tracking servo control signal from the output signal of the two photo diodes 61 and 62.

As seen from the foregoing description, even when the three signal light beams 10, 11, and 12 are incident on the first and second photo detectors 5 and 6 in a state that these beams are narrowly spaced, the 4D-PD 51 and 2D-PDs 61 and 62, which are formed, with less strict precision, on the sensing surfaces of the first and second photo detectors 5 and 6, can receive the maximum quantity of light. Accordingly, during manufacture, the photo diodes may be positioned with a relatively large tolerance. Further, the optical paths of the transmitted signal light beams may be shortened, since there is no need for the beam enlarging functions of the concave lens 7 used in the prior art. Further, the second photo detector 6 for receiving the reflected signal light beams may be disposed inside the light source 1. These beneficial features lead to a size reduction of the optical information-reproducing apparatus.

With the use of the first and second photo detecting means receiving the signal light beams, the distance between the photo detecting elements of the photo detecting means can be expanded. Accordingly, there is no need for a high order, complex microfabricating technique for fabricating the photo detecting means. Further, the optical path of the signal light beams can be reduced in length, leading to a size reduction of the overall apparatus.

In the embodiment described above, the plane-parallel plate is made of a transparent medium and the planes arranged parallel to each other are also transparent. If required, one of the parallel planes may be coated with a semitransparent half-silvered mirror.

Also, in the embodiment shown, the first photo detector 5 contains the 4D-PD and the second photo detector 6 contains the two 2D-PDs. This can, however, be reversed so that the photo detector 5 contains the two 2D-PDs and the diode 6 contains the 4D-PD.

What is claimed is:

1. An optical information-reproducing apparatus comprising:
    a light source for emitting light beams for reading data from a recording surface of a recording medium;
    a diffraction grating for diffracting a light beam emitted from said light source, thereby to split said light beam into three light beams arranged in respective diffraction directions;
    a plane-parallel plate means having two major sides, a first side and a second side, parallel to each other, said plane-parallel plate means for:
        (a) reflecting the three light beams on the outer surface of the first side toward the recording surface of the recording medium,
        (b) receiving the signal light beams reflected from the recording surface of the recording medium,
        (c) allowing the received signal light beams to transmit therethrough,
        (d) emitting the received signal light beams from the outer surface of said second side of said plane-parallel plate means,
        (e) reflecting part of the signal light beams on the inner surface of the second side,
        (f) allowing the reflected signal light beams to pass therethrough, and
        (g) causing the reflected signal light beams to be emitted from the outer surface of the first side of said plane-parallel plate;
    an objective lens for imaging the three signal light beams, which are reflected on the outer surface of the first side of said plane-parallel plate, on the recording surface of the recording medium;
    first photo detecting means for detecting one of:
        (a) the center light beam, and
        (b) the side light beams of the three signal light beams emanating from the outer surface of the second side of said plane-parallel plate, thereby to detect the signal light; and
    second photo detecting means for detecting the other of:
        (a) the side light beams, and
        (b) the central light beam of the three signal light beams emanating from the outer surface of the second side of said plane-parallel plate, thereby to detect the signal light.

2. An apparatus according to claim 1, in which said first photo detecting means detects the central light beam of the three signal light beams and outputs an electrical signal in the form of a data signal and a focus control signal, and
    said second photo detecting means detects the side light beams of the three signal light beams and outputs an electrical signal in the form of a tracking control signal.

3. The apparatus of claim 1 in which said first and second photo detecting means detect signal light without passing the three signal light beams through said diffraction grating after the beams have reached the recording medium.

* * * * *